Patented July 29, 1924.

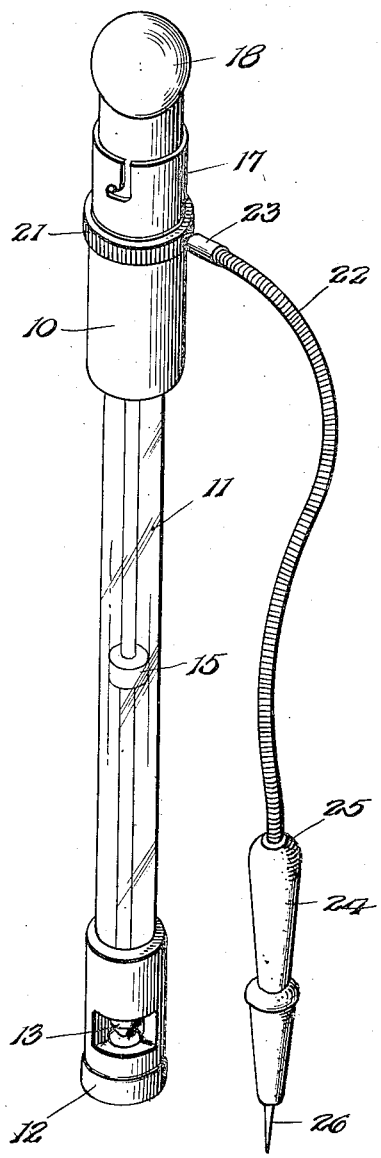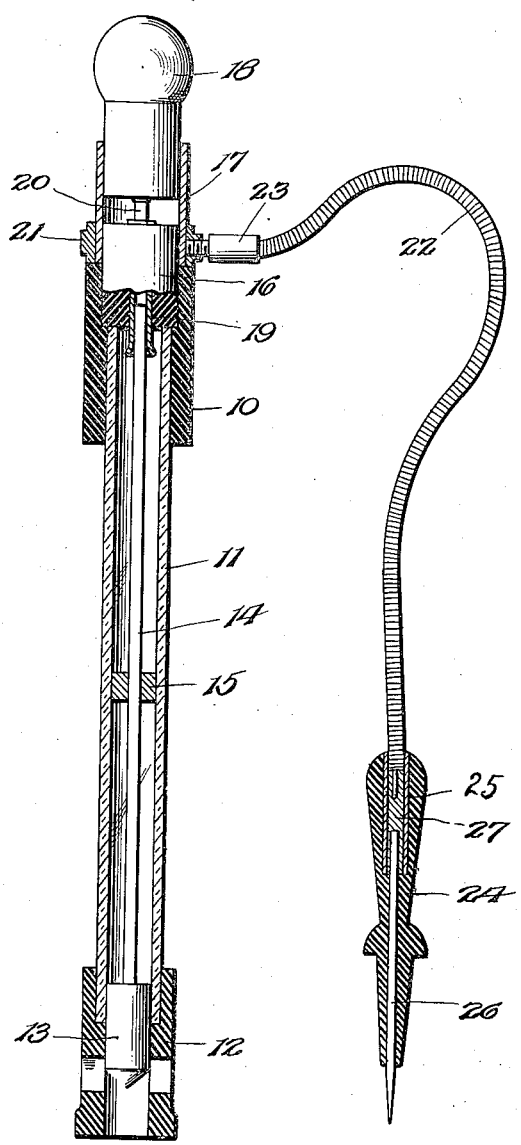

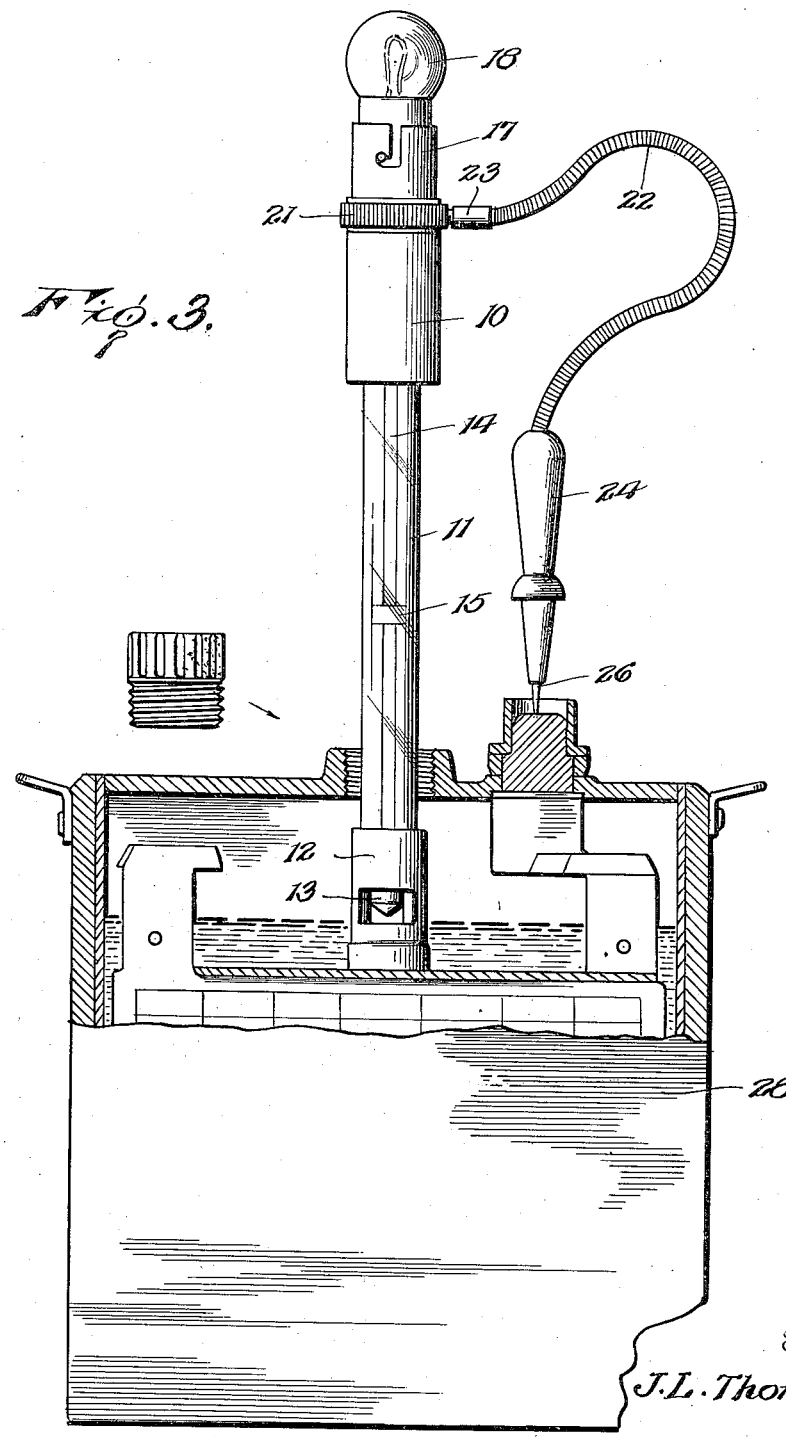

1,502,928

UNITED STATES PATENT OFFICE.

JAMES L. THOMPSON, OF GREENSBURG, PENNSYLVANIA.

STORAGE-BATTERY TESTER.

Application filed July 15, 1920. Serial No. 396,520.

*To all whom it may concern:*

Be it known that I, JAMES L. THOMPSON, a citizen of the United States, residing at Greensburg, in the county of Westmoreland and State of Pennsylvania, have invented certain new and useful Improvements in Storage-Battery Testers, of which the following is a specification.

This invention relates to an improved storage battery tester and has as one of its principal objects to provide a device operable alone by the electrical energy of the battery.

The invention has as a further object to provide a device employing a visible electrically energizable indicator and wherein by inserting the device into a storage battery and completing the circuit through the indicator, the indicator will, under normal circumstances, be energized.

A further object of the invention is to provide a device which may be employed for determining whether or not the electrolyte of the battery is at its proper level.

The invention has as a further object to provide a device which may be employed for determining whether or not the electrolyte of the battery is weak.

A still further object of the invention is to provide a device which may be employed for determining whether or not the cells of the battery are worn out or dead.

And the invention has as a still further object to provide a device which may be employed for determining the polarity of the battery terminals.

Other and incidental objects will appear hereinafter.

In the drawings:

Figure 1 is a perspective view of my improved tester.

Figure 2 is a vertical sectional view taken medially through the device, and

Figure 3 is a side elevation showing the manner in which the device is employed for testing batteries, the battery being partly broken away and illustrated in section.

In carrying the invention into effect, I employ a shell 10 which is preferably of suitable insulating material and fitted into the lower end portion of the shell is a tube 11. This tube may be of glass so as to be transparent but, if preferred, may be formed of other suitable material and fitted over the lower end portion of said tube is a combined spacing and guard cap 12 having an internal shoulder abutting the lower end edge of the tube. As will be noted, the cap is formed at opposite sides thereof as well as through its lower end, with suitable openings so that a liquid may enter within the cap. Snugly fitting in the lower end portion of the tube to project downwardly within the cap is an electrode 13 of cadmium. As will be observed, the cap projects considerably below said electrode for protecting the electrode. Extending upwardly within the tube 11 axially thereof from the electrode is a conductor 14 which is preferably of lead and surrounding said conductor within the tube is a suitable gasket 15 designed to prevent liquid from rising to the top of the tube.

Mounted upon the shell 10 is an electric lamp socket which is of the single contact type. This socket includes a core 16 of suitable insulating material which is snugly fitted into the upper end portion of the shell to abut an internal shoulder therein. Surrounding the upper end portion of the core is a metallic jacket 17 provided at opposite sides thereof with suitable bayonet slots for removably receiving an electric lamp as conventionally illustrated at 18, this lamp providing the indicator of the present device. Projecting from the lower end of the core within the tube 11 is a tubular conductor 19 which snugly receives the upper end portion of the conductor 14 therein and projecting from the upper end of the core is a spring pressed contact 20 engaging the contact of the lamp 18. Surrounding the jacket 17 of the lamp socket to rest against the upper end of the shell 10 is a collar 21 and connected to this collar is a flexible, preferably armored cable 22 which, at one end, carries a thimble 23 from which projects a stud threaded through the collar to impinge the jacket 17. The thimble 23 is, of course, electrically connected with the circuit wire of the cable so that said thimble provides an electric connection between the collar and said wire. Further, as will be noted, the stud of the thimble will serve to lock the collar upon the jacket of the lamp socket. At its free end, the cable 22 carries a handle 24. This handle is preferably of suitable insulating material and fitted into the upper end of the handle is a metallic sleeve 25 which receives the outer end portion of the cable therein. Extending downwardly through the handle axially thereof is an electrode 26 which projects at the outer end of the handle and, at its inner end, is received within the adjacent end of the sleeve 25. The circuit wire of the cable is bared within the sleeve and filling the sleeve is a bond 27 of solder electrically uniting the circuit wire of the cable with the electrode 26 as well as securing the electrode and wire within the sleeve. Thus, as will be seen, the electrodes 13 and 26 are connected in series and interposed in the circuit is the indicating lamp 18.

In Figure 3 of the drawings, I have shown the manner in which the device is employed for testing a battery. In this figure, the battery is conventionally illustrated at 28. As illustrated, one of the vent plugs of the battery is removed, when the tube 11 is inserted into the battery so that the guard cap 12 rests upon the battery plates when, under normal circumstances, the electrode 13 will be immersed in the electrolyte of the battery. Consequently, when the electrode 26 is engaged with an adjacent terminal of the battery, the electrolyte of the battery will act upon the cadmium electrode 13 to set up a current flowing through the lamp 18. Thus, as will be seen, if the electrolyte of the battery is weak, the lamp 18 will glow but dimly, thus indicating the condition of the electrolyte. Further, should the battery cell be worn out or dead, no current will be generated so that the lamp 18 will not be energized, thus indicating the condition of the cell. The guard cap 12 extends such distance below the electrode 13 that when rested upon a battery cell, as shown in Figure 3, said cap will space the electrode 13 above the cell at the proper level of the electrolyte within the battery. Accordingly, should the electrolyte within the battery be at a level below normal, the electrode 13 will not be immersed so that when the electrode 26 is applied to the terminal of the battery, the lamp 18 will not be energized, thus indicating that the electrolyte is below its normal level. If water is then introduced into the battery in a sufficient quantity to cause immersion of the electrode 13 and the lamp 18 still fails to be energized, it may then be concluded that the battery cell is worn out. To test the polarity of a battery, the tube 11 is inserted in the battery, as shown in Figure 3, when the electrode 26 is engaged with one of the terminals of the battery. If such terminal happens to be a positive terminal the lamp will be energized, assuming, of course, that the battery is in good condition. On the other hand, if such terminal happens to be a negative terminal, the lamp 18 will not be energized. Thus, the positive and negative terminals of the battery may be readily determined. I accordingly provide a particularly effective device for the purpose set forth and, as will now be appreciated from the foregoing description, a device wherein the indicator thereof will alone be energized by the electrical energy of the battery being tested.

Having thus described the invention, what is claimed as new is:

1. A storage battery tester including a shell, a lamp socket carried thereby, an indicating lamp fitted in said socket, an immersible electrode coupled with the shell and electrically connected with the socket, a collar surrounding the socket in circuit with the lamp, a cable connected to said collar and provided with means to coact with the socket locking the collar in position, and a contact electrode connected to said cable.

2. A storage battery tester including a shell, a tube of insulating material fitting in one end of the shell, a jacket having a core therein fitting in the opposite end of the shell, an indicator fitting in said jacket, an immersible electrode mounted in the opposite end of said tube, a conductor extending through the tube electrically connecting said electrode with the indicator, and a flexibly supported contact electrically connected with said jacket.

In testimony whereof I affix my signature.

JAMES L. THOMPSON. [L. S.]